July 1, 1924.

H. BANKE

CLUTCH RING

Filed Nov. 17, 1920

1,499,632

Inventor
Herbert Banke
By: Munday, Clarke & Carpenter
Attys

Patented July 1, 1924.

1,499,632

UNITED STATES PATENT OFFICE.

HERBERT BANKE, OF MAYWOOD, ILLINOIS, ASSIGNOR TO AMERICAN CAN COMPANY, OF NEW YORK, N. Y., A CORPORATION OF NEW JERSEY.

CLUTCH RING.

Application filed November 17, 1920. Serial No. 424,586.

*To all whom it may concern:*

Be it known that I, HERBERT BANKE, a citizen of the United States, residing in Maywood, in the county of Cook and State of Illinois, have invented a new and useful Improvement in Clutch Rings, of which the the following is a specification.

My invention relates in general to pulley wheels and the like, which are operated by means of a friction clutch, and more particularly to a clutch ring adapted to be engaged by the clutch members to turn the wheel.

A principal object of the invention is the provision of a detachable clutch ring, which may be replaced upon the wheel, thus rendering it unnecessary to discard the entire wheel when the ring part, which sustains the greatest wear, is worn beyond use.

A further object of the invention is the provision of means whereby a ring of this type may be so rigidly attached to the wheel that it forms practically an integral part thereof and is engaged by the clutch members as firmly as if a part of the wheel itself.

A particular object of the invention is the provision of a clutch improvement to be used in connecton with scroll shear presses in the can industry, that being a practical and tested use, though it is manifest that it is not limited to that particular type of machine.

Other objects and advantages of the invention will be apparent as it is better understood from the following description when considered in connection with the accompanying drawing illustrating a preferred embodiment thereof.

Referring to the drawing.

Figure 1:
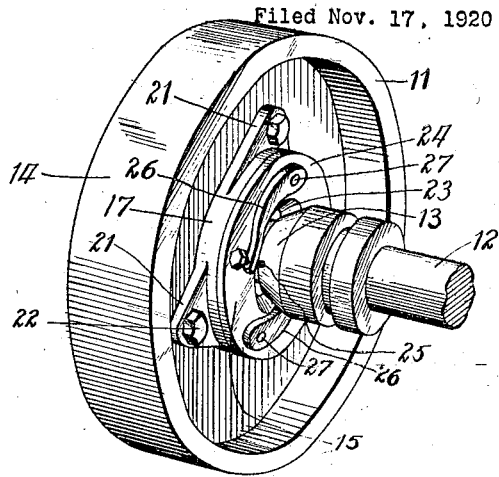
Figure 1 is a perspective of a pulley wheel and clutch showing my improvement.
Figure 2:
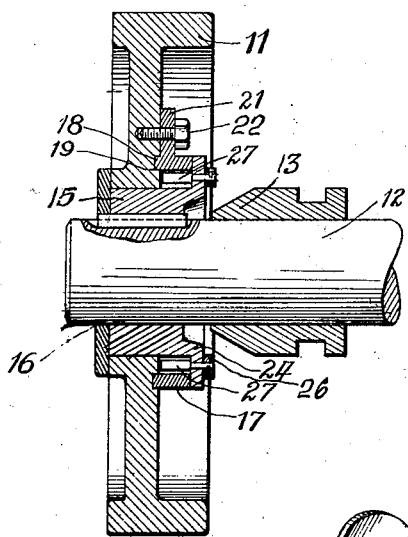
Fig. 2 is a vertical section taken through the wheel, clutch and attachments.

It will be noted that I have shown on the drawings, which disclose an embodiment of my invention, a pulley wheel 11 carried on a shaft 12 and operated by means of a cone clutch shifter 13. The wheel has an outer band 14 and a body part 15 in which is an aperture 16 for the shaft 12, which latter is keyed to the body. The body 15 is separate from the outer part of the wheel and forms a journal for the same (Fig. 2) on which said outer part may turn freely when the clutch is not in operation. A clutch ring 17 has an edge 18 adapted to fit in a groove 19 extending around the aperture 16. This ring has ears 21 protruding from its periphery and adapted to be attached by means of bolts 22 to the outer part of the wheel. It will be apparent that this ring may be removed and replaced when it becomes worn without requiring the discarding of the complete pulley wheel.

The clutch shifter 13 is carried on the shaft 12 and is adapted to cause the inner surface of the ring 17 to be engaged to turn the wheel.

The means whereby this engagement is effected are those usually employed in the use of cone clutches. As the clutch shifter enters a beveled aperture 23 in a plate 24, forming a part of the body 15 and fitting against the outer part of the clutch ring, screws 25, carried on arms 26, climb up the cone part of the clutch shifter. This causes the arms 26 to turn pins 27, upon which they are mounted.

Figure 3:
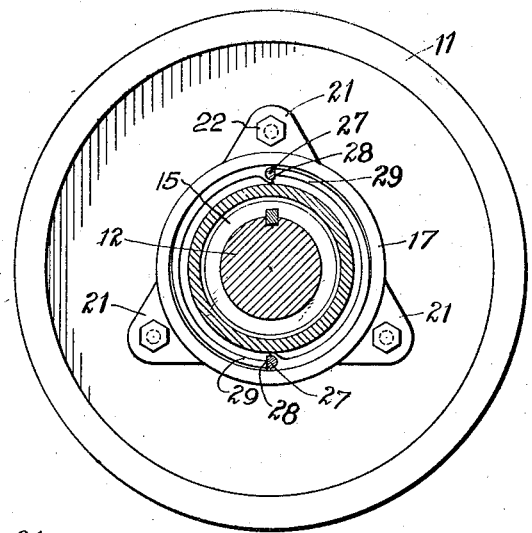
Fig. 3 is an elevation of the wheel and ring.
Figure 4:
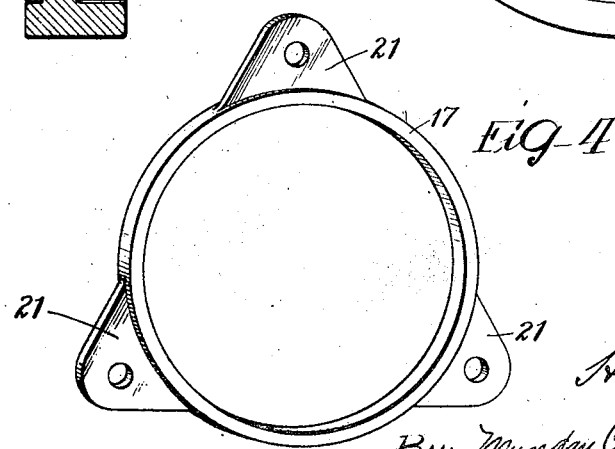
Fig. 4 is an enlarged view of the ring detached.

By reference to Fig. 3 it may be seen that these pins have a flat side 28 which, when in normal position, acts as a stop for the ends of internal spreaders 29. When turned by the movement of the arms 26, peripheral engagement of the ends of the spreaders with the rounded part of the pin causes firm engagement of said spreaders with the inner surface of the clutch ring. In this manner, the wheel 14 is caused to revolve with the shaft 12.

It has been a common experience to have the ring part of wheels of this type worn so that they are no longer fit for use while the wheel otherwise is in good condition. It of course, was necessary, under such circumstances, to discard the entire wheel. My invention has the distinct advantage of making possible the replacement of this early worn part without changing the wheel itself. Its economy and efficiency is, therefore, obvious.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a friction clutch wheel, the combination of a shaft, a wheel which may run freely relative to said shaft or be frictionally clutched therewith, a body element keyed with the shaft and forming a journal on which said wheel is mounted and having a flange extending radially beyond its journal portion, expansible friction elements movably mounted at the inner side of said flange, pivot elements extending through said flange and having their inner ends constructed to expand said expansible elements, a clutch shifter and means for thereby turning said pivot elements, and a continuous clutch ring rigidly secured to and separable from said wheel and enclosing said expansible elements and engaged on its edge by said flange of the body element.

2. In a friction clutch wheel, the combination of a shaft, a wheel which may run freely relative to said shaft or be frictionally clutched therewith, a body element keyed with the shaft and forming a journal on which said wheel is mounted and having a flange extending radially beyond its journal portion, expansible friction elements movably arranged on the inner side of said flange, pivot elements extending through said flange and having their inner ends constructed to expand said expansible elements, a clutch shifter which is loose relative to the rotation of the shaft and means for turning said pivot elements, and a clutch ring rigidly secured to and separable from said wheel and enclosing and engageable by said expansible elements and engaged on its edge by said flange of the body element.

HERBERT BANKE.